Sept. 2, 1941.　　　K. C. WELCH　　　2,254,718
LIGHTING FOR MIRRORS
Filed March 6, 1939　　　3 Sheets-Sheet 1

Inventor
Kenneth C. Welch
By Liverance and
Van Antwerp
Attorneys

Sept. 2, 1941.  K. C. WELCH  2,254,718
LIGHTING FOR MIRRORS
Filed March 6, 1939   3 Sheets-Sheet 2

Inventor
Kenneth C. Welch

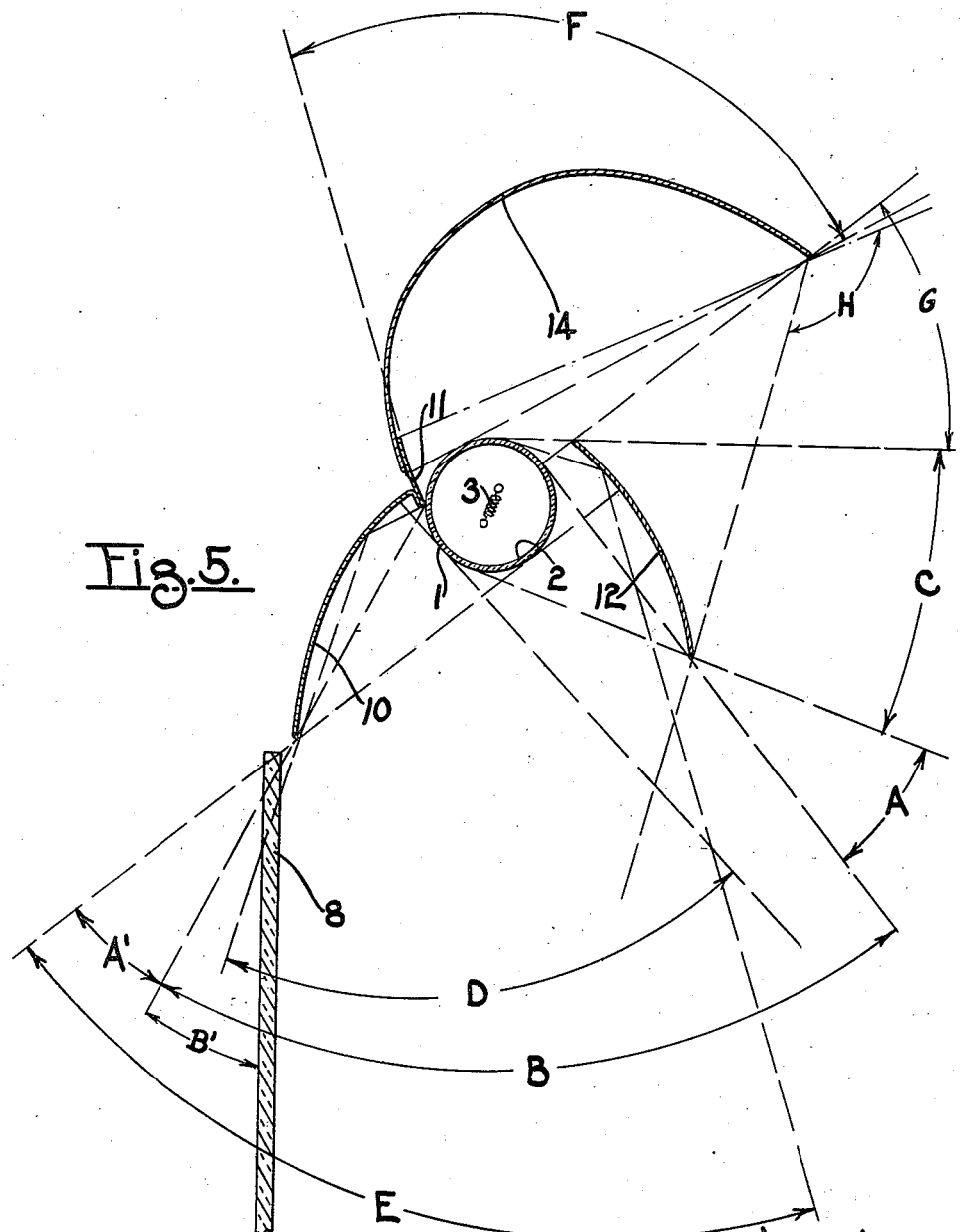

Patented Sept. 2, 1941

2,254,718

UNITED STATES PATENT OFFICE 2,254,718

LIGHTING FOR MIRRORS

Kenneth C. Welch, Grand Rapids, Mich., assignor to Grand Rapids Store Equipment Company, Grand Rapids, Mich., a corporation of Michigan Application March 6, 1939, Serial No. 259,945

14 Claims. (Cl. 240—4.2)

This invention relates to fluorescent lighting means and a reflection unit therefor which is particularly adapted for use with a mirror of the full-length type commonly used in stores when it is desired that a person may completely view himself when standing in front thereof at the customary convenient distance.

Unlike former fixtures of this character, a light source wherein the light emanates from a single point or ball is not used. The light source used with my invention is a comparatively new type wherein the light rays emanate from every point in every direction from the surface of an elongated tube formed of a transparent material such as glass. Obviously, new and different problems arise in attempting to design an efficient reflector for use with a light source of this type because of the fact that the light does not emanate from a single source such as is the case when an incandescent lamp is used. Certain problems arise when it is desired to reflect the light in a manner for the fixture to be used by itself, but still further difficulties are encountered when it is attempted to design a reflecting fixture which has its particular adaptation for use with mirrors as above described and it is by way of solving these problems that the device of the present invention is directed.

It is therefore the principal object of my invention to provide a light fixture for use with mirrors which utilizes as a light source a fluorescent type of lamp.

A further object of my invention is to provide reflecting surfaces around the light source which will direct the reflected light rays in particular predetermined directions and below predetermined points with respect to the mirror and the floor line.

Still another object of the invention is to provide a zone of partial direct light at a height from the floor and a distance in front of the mirror wherein the eyes of a person of normal height will be located when standing a convenient distance away from the mirror to completely view himself therein.

A still further object is to provide reflecting surfaces adjacent the light source which will intensify the direct rays of light below the zone of partial direct light by such an amount that the intensity of the light near the floor line will, as nearly as possible, approach the intensity of the light near the upper portion of the mirror. The term "partial direct light" here means that within this zone it is impossible to view the entire light source, only a part of it being visible.

Another object is to provide a diffused reflecting surface to be positioned with respect to the other specular reflecting surfaces to illuminate the face of the person with a soft indirect light as well as overcome objectionable shadows.

Another object is to provide a corrective color effect on the face of the person while retaining the original color value of the source of light on the figure below the face.

Other objects of the invention will appear as the description proceeds.

To the accomplishment of the foregoing and related ends, said invention then, consists of the means hereinafter fully described and particularly pointed out in the claims.

The annexed drawings and following description set forth in detail certain means and one mode of carrying out my invention said means constituting, however, but one of various ways in which the principle of my invention may be employed.

In said annexed drawings, wherein like reference numerals refer to like parts throughout the various views:

Fig. 5 is a vertical section through the device similar to Fig. 3 but showing also diagrammatically the various zones of light on an enlarged scale from that of Fig. 1.

Figure 1:
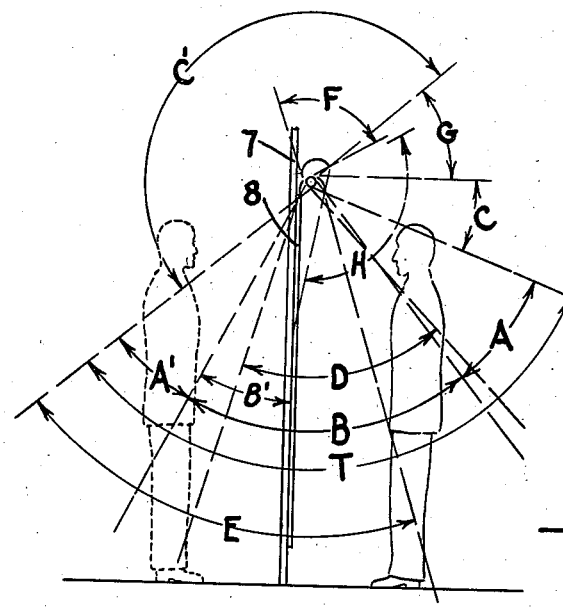
Fig. 1 is a side elevational view of the complete structure showing a person standing before the mirror together with his image as it appears on the opposite side of the mirror, and showing diagrammatically the various zones of light formed by the reflector structure.
Figure 2:
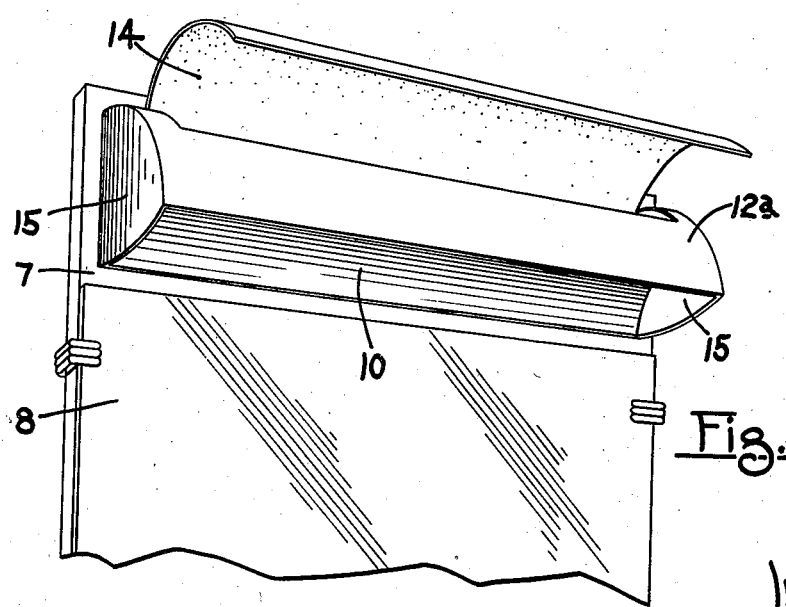
Fig. 2 is an enlarged fragmentary perspective view of the mirror with the device of my invention in position thereabove.

The fluorescent lamp which is employed in the present device, and which forms no part of the present invention, may be briefly described as including an elongated glass tube 1 which has the inner surface 2 thereof coated with a thin film of a fluorescent powder. Each end of the tube is provided with electrodes 3 which, when energized, set up normally invisible waves of energy. The tube is filled with a gas or gases such as argon or mercury vapor which act as a medium through which these invisible waves of energy may pass. The thin coating of fluorescent powder on the inner surface of the tube is acted upon by these waves of energy and renders them visible to the eye. From this brief description it will be seen that the fluorescent coating throughout the entire length of the tube acts as an individual source of light which emanates light rays in every direction. Therefore, the actual source of light from this fluorescent lamp is the entire inner surface of the tube and the source is not confined to substantially a point as is the case when an incandescent lamp is used wherein the filament is heated to a high degree of incandescence. That certain problems will arise when attempting to reflect this light properly is obvious.

The lamp is held in position by means of the holder 4 in connection with a choke coil and switch 5. This choke coil and switch are necessary auxiliaries of a fluorescent lamp, but since this particular feature forms no part of the present invention it need be mentioned here only insofar as it relates to the actual mounting of the lamp itself.

The structure thus far is formed with a back portion 6 which is secured in any suitable manner above the mirror 8 and the mirror 8 is mounted in a vertical plane in any suitable way as against a wall 7.

It is to be understood that a mirror produces the same result to the vision of a person as would be obtained by omitting the mirror and placing an identical object twice the distance from that which would have been reflected in the mirror and that the light rays reflected back upon the object from the mirror are identical with those which would directly illuminate the said identical object in the absence of a mirror. In the accompanying drawings it has been chosen to illustrate the reflected image of the observer as that of an identical person on the other side of the mirror and to illustrate the light which would be reflected from the mirror on the person as directly illuminating the imaginary figure in the absence of a mirror.

Therefore in considering this illustration, and particularly that of Fig. 1, it will be understood that all zones of light indicated as passing through the mirror or at the back side thereof and illuminating the dotted "identical person" are actually reflected from the mirror and illuminate the figure of the actual person in front of the mirror and increase the intensity of the light zones in that location.

The reflecting structure itself is composed of a plurality of specular reflecting surfaces in combination with a diffused reflecting surface. One of the specular reflecting surfaces 10 is arcuate in form and has its lower terminal edge slightly above the upper terminal edge of the mirror 8. This surface then extends upwardly and forwardly to a point adjacent the tube 1 of the fluorescent lamp, as clearly shown in Figs. 3 and 5.

Another specular reflecting surface 11 extends upwardly and rearwardly from a point below the upper terminal edge of the reflector 10 and has its upper terminal edge in substantially a horizontal plane tangent to the uppermost point of the tube 1.

A third reflecting surface 12 is positioned in front of the light source and has its upper terminal edge in substantially the same horizontal plane with the upper terminal edge of the reflector 11. The reflector 12 is arcuate in shape and extends forwardly and downwardly to a point below the light source but preferably above the upper terminal edge of the mirror 8. The reflector 12 is preferably composed of the inner surface 12 and the outer surface 12a, although this is not necessary as far as the efficiency and result of the reflecting surface 12 is concerned. The outer surface 12a is provided chiefly because it may take on shapes other than that shown in Fig. 3 so that the outer appearance of the structure as a whole may be altered to suit varying personal tastes, but since the outer form of this reflector is immaterial so long as the inner surface is substantially as shown at 12 in Fig. 4, it may take on any desired configuration.

Figure 3:
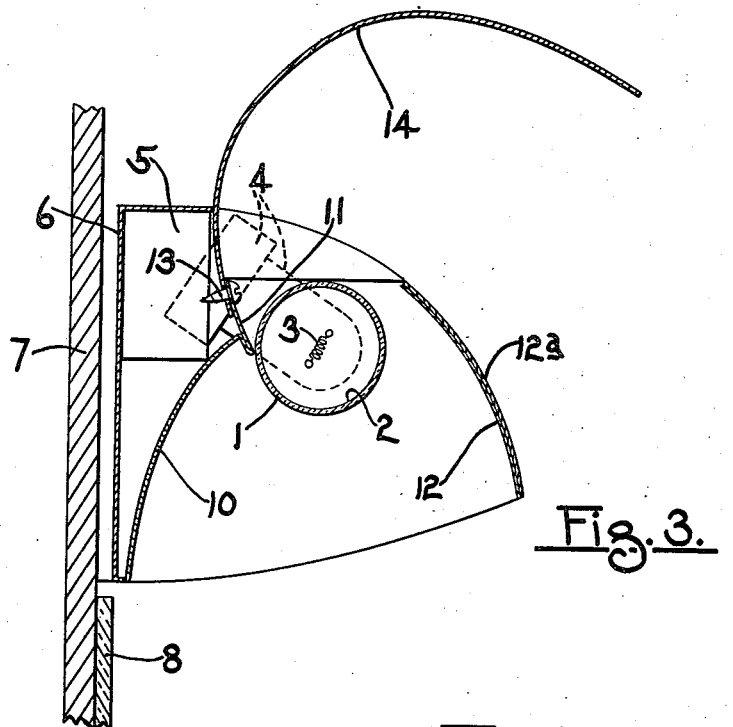
Fig. 3 is a sectional view of the device taken on a vertical plane.

Secured to the upper portion of the reflecting surface 11, by means of the screws 13 or any other desired suitable means, is a dull diffusing reflecting surface 14 which extends upwardly and forwardly so that its outer terminal edge is positioned in a vertical plane preferably in front of the lower terminal edge of the reflecting surface 12, as shown in Figs. 3 and 5. This diffusing surface 14 may be colored for the purpose hereafter described.

The entire structure as above described is provided with end closure members 15 so that the light source is not visible except from within the limits of the lower terminal edges of the reflectors 10 and 12.

It is to be noted that the various reflectors are so disposed with reference to the light source that when a person of normal height stands before the mirror at a distance away from it convenient to view his entire image, the eyes of such person will be located in the zone of partial direct light denoted in Figs. 1 and 5 by the letter A. Above the upper line of zone A none of the light source can be seen directly, and below the lower edge of zone A the entire light source may be viewed. The A' indicates the zone of partial direct light which extends to the mirror and is reflected therefrom.

The zone of light which consists of the full direct light from the light source will be that zone approximately included in the angle B. The portion of this light which is intensified by the direct rays being reflected from the mirror onto the image is denoted by the angle or zone B'.

The angles C and C' designate the zones wherein no direct light or specular reflected light will appear, because of the obstruction of reflectors.

The angle D indicates the zone and the approximate angle of light which is reflected from the reflecting surface 10 and which tends to build up or intensify the direct light on the person at all points below the upper edge of the zone, or substantially from the shoulders downwardly.

The angle E designates the zone of light reflected from the reflector 12 and intensifies directly the light falling on the lower portion of the person and intensifies the light falling on substantially the entire person below the shoulders by means of its reflection from the mirror.

The purpose of the specular reflector 11 is to intensify the light on the diffusing reflector 14, and the angle F denotes the zone of light which is increased by means of the reflecting surface 11, which is substantially the entire surface of the diffused reflector.

The angle G denotes the zone of light which is lost and is not utilized for lighting the person or figure before the mirror except as it might reach some other surface not a part of this design and in turn be reflected back to the figure.

The angle H denotes the zone of indirect light which is reflected from the diffusing surface 14. This zone of reflected light also casts a glow on the outer surface 12a and eliminates the contrast of the more brightly lighted surface 14 with the surface 12a. This indirect light emanating from the diffused surface 14 decreases to a minimum at the edges of the zone and reaches a maximum near the center, that is, it tends to decrease in intensity as it overlaps zones B, D and E thus tending to reduce objectionable shadows cast on the figure from the surfaces 12 and 12a.

The angle T denotes the limits within which all of the light rays are confined, except those which are diffused, and all of the direct and specular reflected rays fall within these limits.

It will be seen, then, that when a person of normal height stands before a mirror provided with my invention, his eyes will normally be located in a zone wherein only partial direct light can reach them. This obviates any possibility of objectionable glare since the entire light source cannot possibly be seen from within this zone. The person thus viewing himself in the mirror will be illuminated from approximately his shoulders downwardly by means of light rays emanating directly from the light source and the lower part of his figure will be illuminated also by direct light rays being reflected from the upper portion of the mirror, thus intensifying the direct light rays which have not been reflected.

The light rays directly striking the body from the light source will also be intensified from approximately the shoulders downwardly by light rays reflected from a portion of the specular reflector 10. The portion of these specular reflected rays which are again reflected from the mirror will strike the figure near the lower part thereof. That portion of the specular reflected light rays from the reflector 12 will directly strike the figure at a point below the waist and will illuminate all points therebelow, and those specular reflected rays from the surface 12 which are again reflected from the mirror will illuminate the entire body thereby intensifying still more the light rays reaching it from the other sources.

From this explanation it will be apparent that my device is designed to fully illuminate a figure before the mirror, and at the same time prevent the eyes of the viewer from receiving any objectionable glare directly from the light source. In any construction of this nature various shadow formations are bound to appear, and to decrease the obviousness of such shadows the diffused reflecting surface 14 is provided. It is to be understood that the exact configuration of this diffused surface as shown in the figures of the drawings need not be precisely followed since any other desired configuration may be employed so long as the effect is retained. This effect being to reduce shadows, reduce the contrast between the comparatively brightly lighted surface 14 and the outer surface 12a of the reflector 12, and to produce general illumination around the figure.

The face and eyes of the person are illuminated largely by the diffused light reflected from the surface 14 which is desirable because it is of a soft unglaring nature and does not interfere with the person's vision. It is usually desirable to use a light source producing a light of daylight color and it has been found that this color illuminating the face may be uncomplimentary to the complexion. Ladies particularly may be sensitive to this uncomplimentary reflection. To overcome that objection the surface of the diffusing reflector 14 may be colored with some warm color which will reflect a soft light more complimentary to the person's complexion and this colored light zone is that which largely illuminates the face of the person, which is closest to the reflector, and the colored light is largely either dissipated or counteracted by the stronger direct or reflected lights on the lower part of the person where it is not desired.

Figure 4:
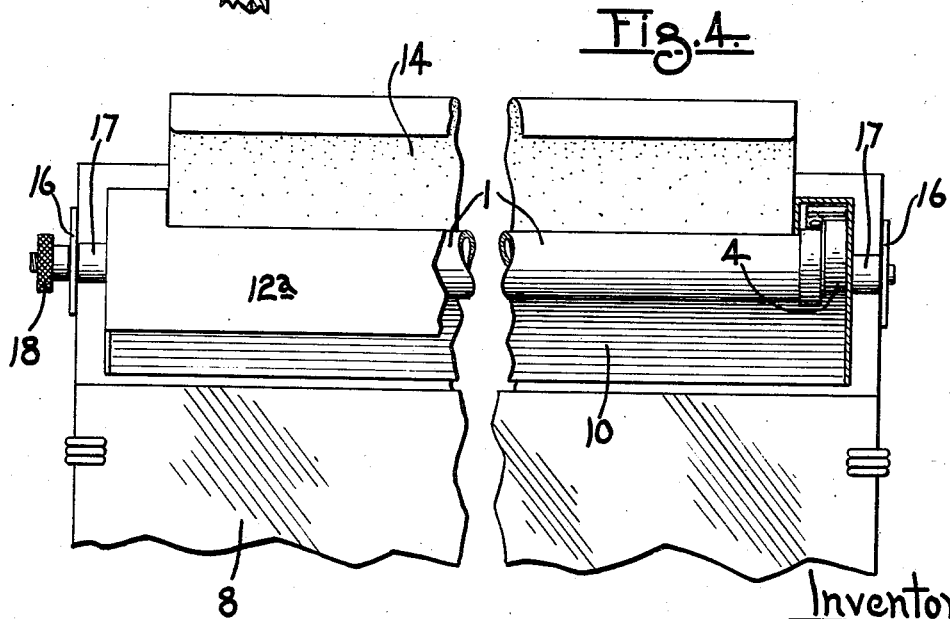
Fig. 4 is a fragmentary broken front elevational view of the device, together with a modification thereof, showing one end in section

Thus far my invention has been described as being applicable to a person of normal height, but in order that the device need not be entirely so limited, and in order that persons both taller and shorter than those of normal height may employ the device with equal efficiency, I have provided the modification shown in Fig. 4 by means of which it is possible to tilt the light reflecting structure in either direction. If an exceptionally tall person is to use the device it may be tilted upwardly, or in a counter-clockwise direction, so that the zone of partial direct light indicated by the letter A may be raised to accommodate the eyes of such person. Again, if an exceptionally short person is to use the device, it may be tilted forwardly or in a clockwise direction in order to lower the zone of partial direct light indicated by the letter A. When the reflecting unit is thus tilted, all of the other zones of light will naturally be either raised or lowered thus accommodating the entire structure to the use of persons exceptionally tall or short.

Although the means which may be utilized to effect a tilting of the reflecting device may be considerably varied, by way of illustration, I have shown the structure as provided with a plate 16 at each end thereof with trunnions 17 connecting the plates with the ends 15. One of the trunnions may be threaded to receive a thumb screw 18 which may be loosened to tilt the device and then tightened in order to secure the structure in the desired position.

It will be apparent from the above disclosure that I have designed a reflecting unit for particular use with a light source of the fluorescent tube type in connection with mirrors to completely and efficiently illuminate a figure standing therebefore. The device is economical to manufacture and may be used most satisfactorily for persons of practically any height.

Other modes of applying the principle of my invention may be used instead of the one here explained change being made as regards the structure herein disclosed provided, however, that the means stated by any of the following claims or the equivalent of such stated means be employed.

I, therefore, particularly point out and distinctly claim as my invention:

1. A device of the class described comprising, a mirror, an elongated fluorescent light source, elongated arcuate specular reflecting surfaces disposed behind and in front of said light source terminating in a plane below said light source and above said mirror, and a separate diffused reflecting surface extending upwardly and outwardly from adjacent the rear of said light source to intercept direct light rays and blend the light rays thus reflected with direct reflected rays, to reduce shadows to a minimum.

2. The combination of elements defined in claim 1, combined with a specular reflecting surface located above said first named reflector and behind said light source to intensify the direct light rays intercepted by said diffused reflecting surface.

3. A device of the class described comprising, a vertical mirror substantially equal to the height of a normal person, a diffused reflecting surface extending above and in front of said mirror, a light source above and in front of said mirror and below said reflecting surface, a specular reflector behind said light source to intensify the light reaching said diffused reflector, a second specular reflector behind said light source terminating therebelow, and a third specular reflector in front of said light source terminating therebelow, said second and third reflectors so shaped as to direct some of the light rays reflected therefrom downwardly in front of said mirror and some directly into the mirror, the light rays reflected from the diffusing surface blending with the direct reflected rays to reduce shadows to a minimum.

4. The combination with a vertical mirror substantially equal to the height of a normal person, of a lighting fixture therefor comprising, a light source located above and in front of said mirror, a specular reflector behind the light source to intensify some of the direct rays of light falling on a person viewing himself in the mirror, a specular reflector in front of said light source to intensify the direct rays of light falling on the mirror, and a diffusing reflector extending upwardly and forwardly from immediately behind the light source to a point above the specular reflector in front of the light source, the rays reflected from said diffusing reflector blending with the direct reflected rays to reduce shadows to a minimum.

5. The combination of elements defined in claim 4, said diffusing reflector adapted to direct diffused light rays to the face and eyes of said person.

6. The combination of elements defined in claim 4, combined with another specular reflector behind said light source to intensify the light rays reaching said diffused reflector.

7. The combination of elements defined in claim 4, combined with means for tilting all of said reflectors and light source as a unit with respect to said mirror, to accommodate persons of different heights.

8. The combination of elements defined in claim 4, combined with another specular reflector behind said light source to intensify the light rays reaching said diffused reflector, and means for tilting all of said reflectors and light source with respect to said mirror, to accommodate persons of different heights.

9. A lighting fixture for mirrors comprising, a light source, a reflecting surface between said light source and the mirror and extending below the light source, a second reflecting surface in front of said light source and extending therebelow, and a third reflecting surface extending upwardly from the upper edge of the first named reflecting surface and forwardly from behind said light source, said first and second reflecting surfaces being specular, and said third reflecting surface being diffused.

10. A lighting fixture for mirrors comprising, a light source, a reflecting surface between said light source and the mirror and extending below the light source, a second reflecting surface in front of said light source and extending therebelow, and a third reflecting surface extending upwardly and forwardly from behind said light source, said first reflecting surface being specular, and said third reflecting surface being diffused.

11. The combination of elements defined in claim 10, wherein each of said reflecting surfaces is arcuately shaped.

12. A device of the class described comprising, a mirror, an elongated light source, a reflecting surface located in front of said light source and so arranged as to reflect light rays from the light source onto the mirror, a second reflecting surface behind the light source so arranged as to reflect light rays from the light source onto a person standing before the mirror only below the shoulders of such person, and a third reflecting surface above the light source so arranged that it will reflect light rays from the light source onto the face of said person.

13. The combination of elements defined in claim 12, combined with still another reflecting surface so arranged as to intensify the light rays reaching said third reflecting surface.

14. The combination of elements defined in claim 12, wherein said second reflecting surface is specular, and said third reflecting surface is diffused.

KENNETH C. WELCH.